(No Model.)
R. B. CHAMBERS.
AUTOMATIC CYCLE SUPPORT.
No. 518,914. Patented Apr. 24, 1894.
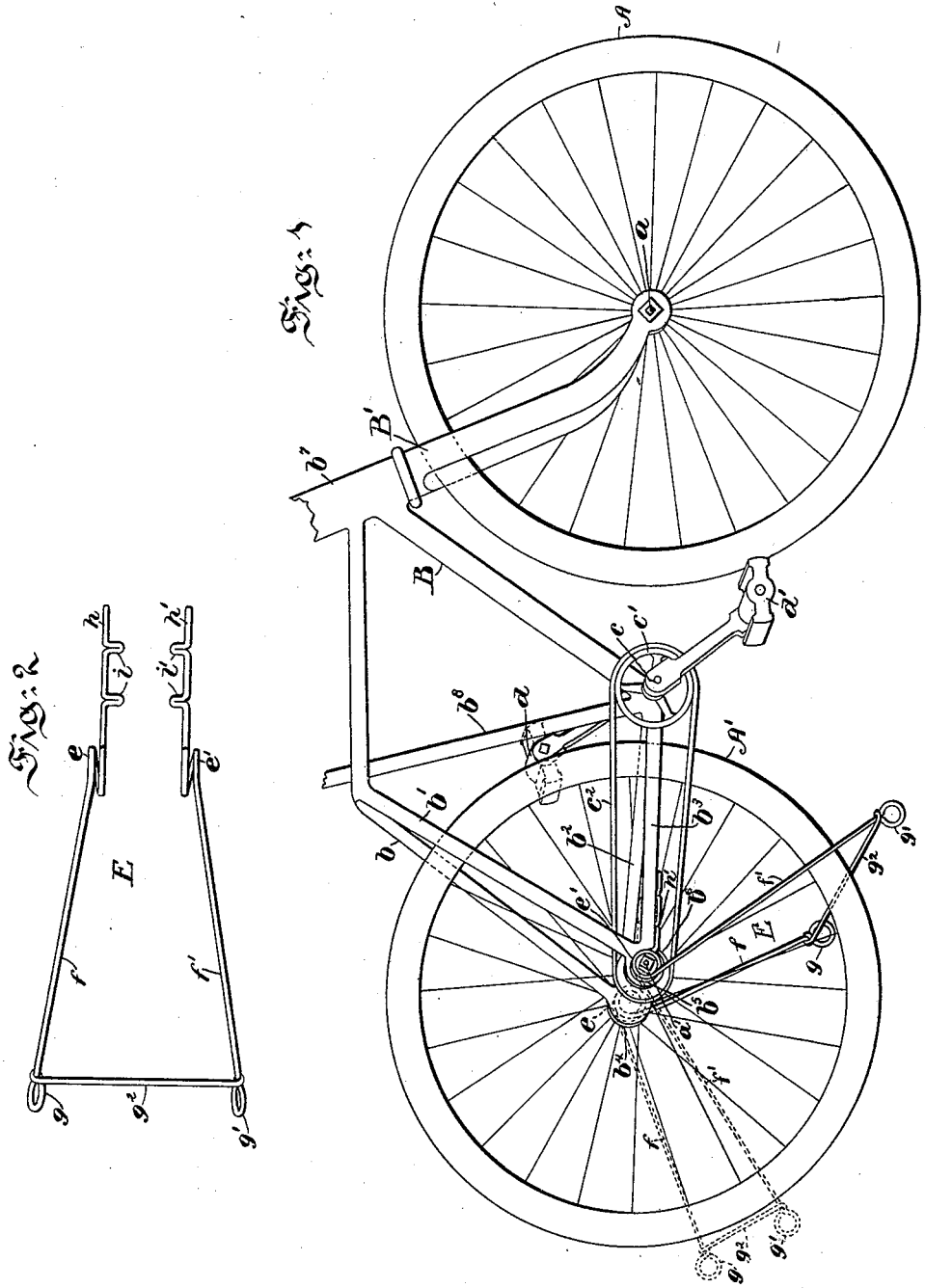
Witnesses:
Thomas M. Smith
Louis Winterberger
Inventor.
Richard B. Chambers,
By J. Walter Douglass
Attorney.

UNITED STATES PATENT OFFICE.

RICHARD B. CHAMBERS, OF WEST CHESTER, ASSIGNOR TO CROSBY M. BLACK, OF CHESTER, PENNSYLVANIA.

AUTOMATIC CYCLE-SUPPORT.

SPECIFICATION forming part of Letters Patent No. 518,914, dated April 24, 1894.

Application filed January 3, 1894. Serial No. 495,498. (No model.)

*To all whom it may concern:*

Be it known that I, RICHARD B. CHAMBERS, a citizen of the United States, residing at West Chester, in the county of Chester and State of Pennsylvania, have invented certain new and useful Improvements in Automatic Cycle-Supports, of which the following is a specification.

My invention has relation in general to bicycles or similar vehicles; and in such connection to an appliance for supporting the same to position when not in use or during mounting thereof.

The principal object of my invention is to provide a simple, inexpensive, durable and efficient automatically operating support for a bicycle or like vehicle for maintaining the same in a vertical position when not in use or during mounting thereof.

My invention consists of an automatically operating support for a bicycle or similar vehicle hereinafter described and claimed.

The nature and scope of my invention will be more fully understood from the following description, taken in connection with the accompanying drawings forming part hereof; and in which—

Figure 1, is a side elevational view of a bicycle of a well known type with a support of my invention shown in application thereto; and Fig. 2, is a top or plan view of the support for a bicycle or similar vehicle of the type shown in Fig. 1.

Referring to the drawings A and A', are the front and rear road wheels of a bicycle.

B, is the back-bone comprising the rear forked inclined and horizontal arms $b$, $b'$, $b^2$ and $b^3$, provided with bearings $b^4$ and $b^5$, to which is journaled the rear road-wheel axle $a'$, carrying a sprocket-wheel $b^6$.

B', is the forked steering rod journaled to the front road-wheel axle $a$, and having a bearing and freedom of movement in a tubular support $b^7$, formed preferably integral with the back-bone B.

$b^8$, is a vertical slanting rod formed with the lower portion of the backbone B, and adapted to support a saddle, not shown.

$c$, is a shaft journaled to the backbone B, and mounted thereon is a sprocket wheel $c'$, and engaging therewith is a chain $c^2$, which also engages with the sprocket wheel $b^6$. On each end of the shaft $c$, are secured pedals $d$ and $d'$.

Having pointed out the main features and elements of a well known type of bicycle, I will now proceed to describe my invention in its application to such a general type of two-wheeled vehicle.

E, is a frame or skirt composed of a single strip of strong wire formed into coils $e$ and $e'$, which are adapted to be sprung onto the hub or axle bearing on each side of the rear road wheel A, of the vehicle, and flaring outwardly in a downward direction forming legs $f$ and $f'$, and twisted at the bottom into loops or rings to constitute feet $g$ and $g'$, linked together at $g^2$. Beyond the coils $e$ and $e'$, are extensions $h$ and $h'$, with inwardly formed lugs or projections $i$ and $i'$, adapted to seat against the bottom surface of the forked arms $b^2$ and $b^3$, of the backbone B, as illustrated in Fig. 1.

The skirt or frame E, comprising the vehicle support is sprung onto each side of the hub or axle bearing $a$, of the back road wheel A, with the extensions $h$ and $h'$, in engagement with the bottom of the horizontal forked arms $b^2$ and $b^3$, and with the legs $f$ and $f'$ and feet $g$ and $g'$, in the position indicated in dotted lines in Fig. 1. By placing the foot on the link $g^2$ and exerting a slight pressure in a downward direction the feet $g$ and $g'$, will be caused to assume a position on the ground or floor perpendicular to a vertical median line through the rear road wheel A, when by a slight movement exerted against the vehicle the feet $g$ and $g'$, of the device E, will be caused to assume the position indicated in full lines in Fig. 1, for maintaining the vehicle firmly in an upright position when not in use or during mounting of the vehicle. It may be here remarked that the tension under which the device is held in use, in an upright position of the vehicle is not such as to overcome the weight or dead load of the vehicle against the same, until the vehicle has been moved forward by the person seated thereon, when the device will automatically move from the position it occupies in full lines to that indicated in dotted lines in the rear of the wheel and above the ground by an easy rising action and assume about the same position indicated in dotted lines in Fig. 1, without retarding the action of the vehicle or interfering with the perfect working thereof.

The particular advantageous feature of the cycle support hereinbefore explained is that it is simple in construction and arrangement and easily applied to any of the many types of bicycles now in general use; and moreover, it is readily manipulated without undue exertion or energy expended in its application to the vehicle and in causing the same to assume either a normal or abnormal position.

Having thus described the nature and objects of my invention, what I claim as new, and desire to secure by Letters Patent, is—

1. A support for a bicycle, comprising a skirt or frame composed of a single piece of wire or the like formed into coils on each side with extensions having lugs or projections forming seats and having legs with feet and the respective feet linked together, substantially as and for the purposes set forth.

2. The combination with a bicycle or similar vehicle, of a support provided with coils mounted on the hub or axle bearing on each side of one of the wheels of the vehicle and having extensions with inwardly projecting lugs seated to certain of the forked arms of the backbone of the vehicle and having inclined legs with feet linked together, substantially as and for the purposes set forth.

In testimony whereof I have hereunto set my signature in the presence of two subscribing witnesses.

RICHARD B. CHAMBERS.

Witnesses:
 ETHEL M. CHAMBERS,
 PHILIP C. WALTON.